Figure 5:
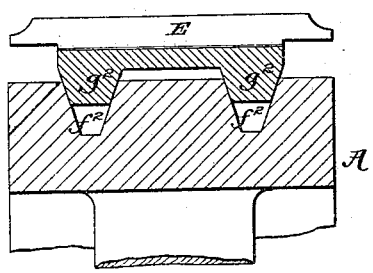

(Model.)
2 Sheets—Sheet 1.
J. M. DODGE.
CHAIN BELT.
No. 248,720. Patented Oct. 25, 1881.
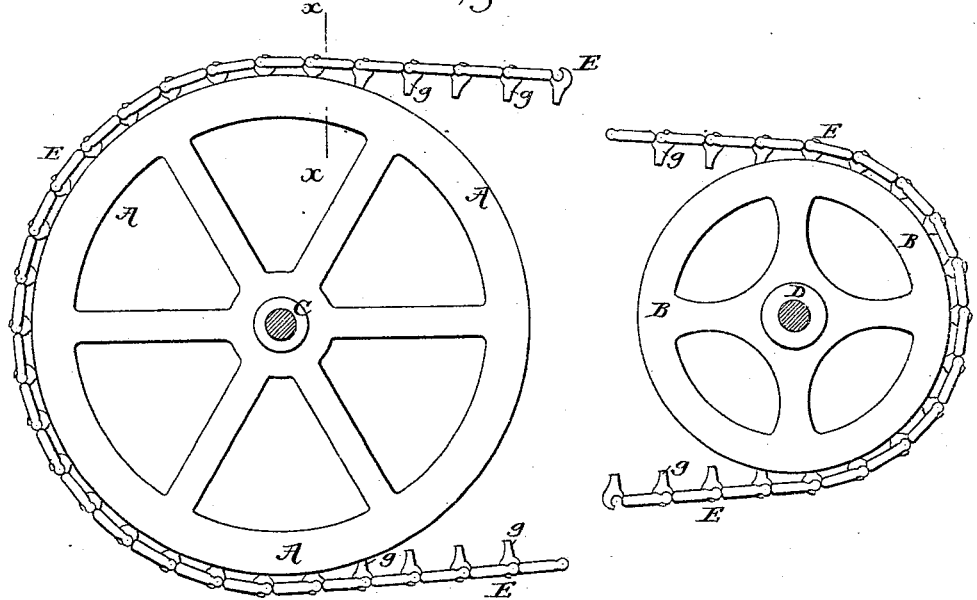
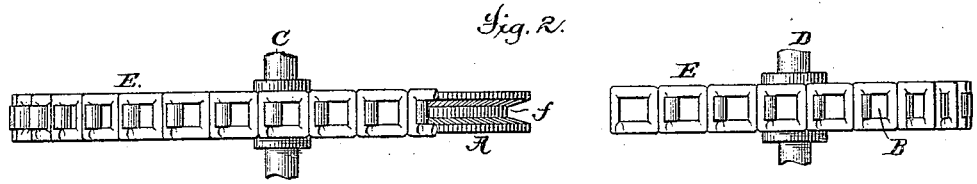
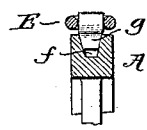
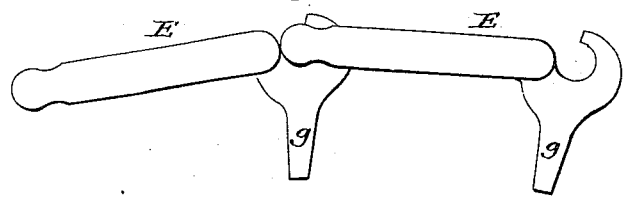
Attest;
Geo. H. Graham
H. Janvier
Inventor,
Jas. M. Dodge
By J. N. McIntire
Atty.

(Model.) 2 Sheets—Sheet 2.

J. M. DODGE.
CHAIN BELT.

No. 248,720. Patented Oct. 25, 1881.

Attest,
Geo. H. Galan
H. Janvier

Inventor,
Jas. M. Dodge
By J. M. C. Intire
Att'y.

UNITED STATES PATENT OFFICE.

JAMES M. DODGE, OF CHICAGO, ILLINOIS.

CHAIN-BELT.

SPECIFICATION forming part of Letters Patent No. 248,720, dated October 25, 1881.

Application filed February 15, 1881. (Model.)

*To all whom it may concern:*

Be it known that I, JAMES MAPES DODGE, of Chicago, in the county of Cook and State of Illinois, have invented certain new and useful Improvements in Chain-Belts; and I do hereby declare that the following is a full and exact description thereof, reference being had to the accompanying drawings, making part of this specification.

Previous to my invention the usual construction and mode of operation of chain-belts have been such that in their use the belt interlocked or engaged positively with the periphery of the wheel in connection with which such belts were run, by means either of some sort of projections or lug-like devices on the belt taking into recesses or depressions in the wheels' periphery, or of some sort of projections on the wheels' periphery engaging with interstices in the working-face of the chain. It has, however, been suggested prior to my invention to construct chain and other metallic belts with tapering projections or lugs adapted to fit into correspondingly-tapered or V-shaped grooves running circumferentially of the peripheries of the wheels on which such belts were designed to be used, the designed operation being such that the necessary engagement between the belt and the wheels would be effected by the mere frictional contact of such tapering projections of the chain with the sides of the V-shaped grooves of the wheels; but in practice this suggested construction of chain-belts and wheels is very defective and objectionable, if not inoperative, for the purposes for which drive-belts are mostly employed.

I propose by my invention to provide for use a metallic drive belt or chain capable of serving satisfactorily all the practical purposes of chains adapted to positively interlock with the peripheries of the wheels on which they are used, and at the same time adapted not to positively interlock with the periphery of the wheel.

To this end and object my invention consists in a drive-chain or metallic belt adapted to engage with the periphery of the wheel it may be designed to work with by means merely of either tapering lugs or projections on or tapering recesses in the working-face of the belt engaging respectively with either a V-shaped groove in or a V-shaped projection on the periphery of the wheel, the construction being such that the tapering bearing-surfaces of the devices of the chain shall come into contact with those of the wheel throughout the whole extent of the former, all as will be hereinafter more fully explained.

To enable those skilled in the art to which my invention appertains to understand and practice the same, I will now proceed to more fully describe it by reference to the accompanying drawings, forming a part of this specification, and in which I have illustrated that mode of carrying out my invention which is the best now known to me and the several forms in which I have successfully practiced it.

Figure 7:
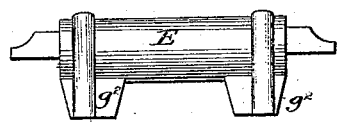
Figure 6:
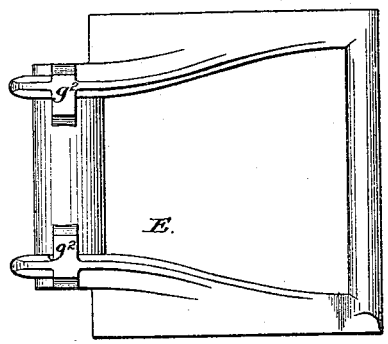
Figure 8:
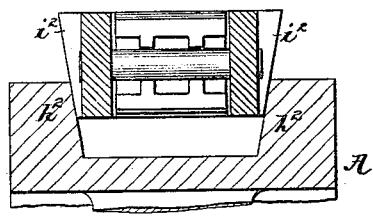
Figure 10:
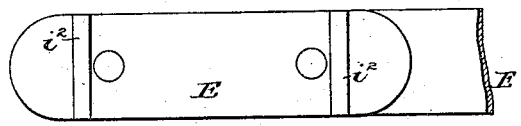
Figure 9:
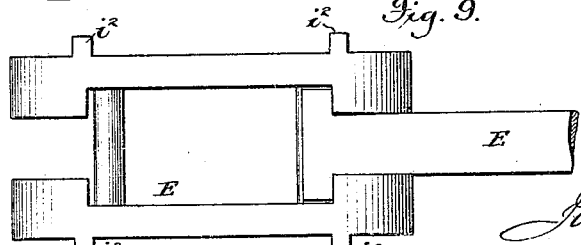

In the said drawings, Figure 1 is a side view, and Fig. 2 is a top or edge view, of a drive-chain and a pair of chain-wheels arranged relatively in a working condition and embodying the principle of my invention. Fig. 3 is a vertical section at the line $x\ x$ of Fig. 1; and Fig. 4 is an edge view of two of the chain-links detached and made on an increased scale, for the purpose of more clearly showing the detail construction thereof. Fig. 5 is a sectional view (similar to that seen at Fig. 3) of a chain and wheel, but showing a modification of my invention, in which the chain-link is of a different form from that shown in the four preceding figures, and in which the face of the wheel used has two grooves instead of one, the portion of its periphery embraced between its grooves forming a wedge-shaped rib, as it were, that acts between the adjacent edges of the two tapering lugs of the chain-link. Fig. 6 is a bottom view, and Fig. 7 is an end view, of a link such as shown in cross-section at Fig. 5. At Fig. 8 I have shown, in vertical cross-section, still another modification of the invention, in which the face of the wheel has one very wide groove or depression, forming two tapering annular bearing-ribs near the edges of said face, adapted to receive the tapering lug-like bearers on the opposite sides of the link of a chain formed of alternate single and double-bar links. Fig. 9 shows in top view, and Fig. 10 in edge or side view, this form of chain.

At Figs. 1 to 4, inclusive, A and B are two wheels mounted in a usual manner on their respective shafts C and D, and either of which may be assumed to be that from which power and motion are to be transmitted to the other through the medium of the drive-chain E. This chain, as shown, is composed, by preference, of detachable open links of rectangular contour, made after the fashion of what is well known in the market as the "Ewart" detachable drive-chain; but neither any given pattern of the chain nor the feature of the detachability of its parts is, of course, particularly relevant to the subject-matter of this application. Each of the said wheels has formed in its periphery or working-face a sort of V-shaped groove or channel, $f$, running circumferentially of the wheel-face; and the working-surface of the chain (that face of the chain which works against the wheels) is formed or provided with a series of projections, $g$, preferably one to each link, each of which is slightly tapering in form, (in one direction,) so as to correspond to the taper of and to fit into the groove $f$ in the manner shown, (see Fig. 3,) without having its end reach quite to the bottom or root of the groove $f$.

In practicing my invention so far I have deemed it expedient and found it desirable to usually have the plane of the lugs or projections $g$ that work in the groove $f$ inclined from a right angle to the plane of the link sufficiently to cause said projections to lie, when in the groove $f$, in planes about coincident with the radii of the wheels on which the chain is intended for use. Of course, in cases like that illustrated, where the chain has to run on different-sized wheels, the inclination just referred to of the lugs $g$ cannot be such as to cause them to lie (while working in the grooves of the wheels) in planes exactly coincident with the radii of both wheels; but they can be made to approximate to this condition relatively to each wheel. The only very essential conditions, however, of these tapering lugs $g$ relatively to the tapering groove $f$ are, first, that the taper of the edges of the lugs and that of the sides or walls of the groove shall, when the lugs are working in the grooves, correspond sufficiently well, and that the bearing-surface of each lug shall be sufficiently narrow in the direction of the length of the chain to cause the lugs to act with a proper wedge-like tendency against the sides of the grooves and take a bite therein, so that by a co-operative action of the said narrow-edged tapering lugs and grooves (or by the active and reactive pressure of these devices) there will be created between the chain and the wheels a sort of griping contact or mutual hold capable of effecting the transmission through these devices of the necessary power and motion without any injurious slip of the chain on the wheels; and, second, that the grooves $f$ be somewhat deeper than the projections $g$ are long, so that the parts may wear away considerably at their tapering surfaces without having the wedge-like tendency or action of the lugs within the grooves and the gripe of the edges of said lugs on the sides of said groove destroyed by an abutment of the ends of the former against the bottom of the latter.

In practice, the weight of the chain being comparatively so much greater than that of an ordinary belt or pulley-band, I have found that with the drive-chain exceedingly slack— that is, in a condition in which, but for its gravity, the chain would not be taut enough to avoid a slip on the wheels—a sufficient gripe of the tapering lugs on the bearing-surfaces of the V-shaped groove is created to render the contrivance successfully operative for most purposes.

The general operation needs little or no further explanation. Either wheel being rotated, the power and motion desired to be transmitted are conveyed through the medium of the chain-belt to the other wheel and its shaft, and the shown and described principle of construction of chain and chain-wheel may, of course, be applied under a great variety of sizes and mere modifications of the details of the parts composing the contrivance. For instance, in lieu of the form of chain and wheel-face shown at Figs. 1 to 4, inclusive, and so far particularly described, the wheel and chain-links may be made as seen at Figs. 5, 6, and 7, where the face of the wheel has two circumferential grooves, at $f^2$ $f^2$, and the chain-link has two correspondingly-tapering lug-like devices, $g^2$ $g^2$, each of which engages with or takes hold in one of said grooves. In practice I have found this form of wheels and chain devices to work exceedingly well, even on large-sized chain-links, the edges of the biting-lugs $g^2$ $g^2$ being made quite narrow, and their taper being comparatively slight; or, under still another modification of my invention, the form of wheel-face and chain seen at Figs. 8, 9, and 10 may be employed, wherein the face of the pulley has two circumferentially-arranged ribs, $h^2$ $h^2$, the adjacent faces of which are slightly tapering, as shown, leaving a broad groove or depression between them, and in which the chain shown is composed of alternate single and double bar links, the exterior sides of the bars of each double-bar link having narrow lug-like projections $i^2$ $i^2$, adapted to have their tapering edges bear against and gripe the tapering surfaces (between which the link is wedged) of the ribs $h^2$ $h^2$ of the wheel.

In any of the various forms in which my invention can be practiced the lug-like devices, the narrow edges of which gripe the bearing-surfaces of the wheel, against which they are forced, may be applied singly or in pairs to each side or edge of each link, or only to some of the links of the chain, according to the sizes of the wheel and chain, and as, in the judgment of the constructer, the designed character of the work to be done may demand they should be arranged.

Other forms in which my invention may be practiced, and different modes of carrying it out that have not yet occurred to my mind, may, of course, be suggested; but it will be fully understood, from what is herein shown and described, that the essential character of my invention rests in the employment, on a metallic drive-belt, of devices having sufficiently narrow and slightly tapering bearing-surfaces, adapted to wedge into and take a gripe or bite on the tapering bearing-surfaces of the wheel's face, between which said devices are wedged by the tractive action of the chain running on the wheel, as described.

It will be seen that by reason of the inevitable (but practically unobjectionable) slip now and then of the chain on the peripheries of the wheels, and the practical impossibility of running the parts together so that the chain-lugs will always bear at precisely the same points along the line of the groove or bearing-surfaces of the wheel, both the lugs and groove will wear away evenly together and maintain a sufficient perfection of fit to each other to insure a continued perfection of operations in the contrivance; and it will be understood that the capacity of the chain and wheel's periphery to slip on each other under extraordinary or unusual strain really renders the contrivance exceedingly better than drive-chain and chain-wheel contrivances in which the parts positively interlocks, since with the capacity created by my invention the chain (like an ordinary belt) can slip in undue strain, thus preventing any injury to the machine, while in the use of drive chains and wheels as heretofore made and used, in case of any extraordinary strain on the contrivance the chain or the sprocket-wheel (or both) must either be broken or otherwise injured.

I am aware of the fact that it has long ago been suggested to employ, in connection with wheels having V-shaped grooves in their peripheries, chain-like driving-bands composed of metal links having attached to them (in some cases at the sides and in others at the backs of the links) wedge-shaped devices composed of wood or leather or other analogous materials, and adapted to engage by frictional contact with the tapering surfaces of such grooves in said wheels, and that patents have been granted for such contrivances. My invention should not, however, be easily confounded with any such contrivances, all of which differ materially from my improvement, as well in practical operation and effect as in the mechanical principles involved. In any such kind of prior contrivances as just alluded to substantially the same principle of operation is involved as occurs in the use of the ordinary leather belt, especially if the belt be in the known form of a band square in cross-section, and be used in conjunction with a pulley having a V-shaped groove in its periphery, for in both cases the hold of the belt on the wheel's periphery is due principally to the frictional contact between a comparatively extensive portion of the curved metallic surface of the wheel and a correspondingly large surface of the banding device, composed of a material of a sufficiently pliable or surface-yielding nature to be capable of adapting itself to a close fit to and a perfect contact throughout with said curved metallic surface, the main effect of any wedge-like action of the devices in contact being that of an enforcement of the surface of the pliable material to perfectly conform to the shape of the inflexible metallic surface, thus insuring the perfect contact throughout of the opposing surfaces and the requisite traction between the wheel and the banding device.

In my novel contrivance, on the contrary, the devices which come in contact with the curved metallic surfaces of the wheel being likewise metallic, and hence having inflexible and unpliable surfaces, there can be no such effect as just alluded to produced on either of the opposing surfaces by the wedge-like action of the parts, and the effectiveness of the contrivances depends upon the reduction of the extent of the surfaces of contact of the wheel and banding device to the smallest practical extent, the efficiency of action depending upon having the surface of each tapering bearing-lug of the chain so narrow that it will occupy a space on the wheel's face so short in the direction of the circumference of the wheel as will be practically a straight or flat surface.

I am also aware of the fact that it is has been suggested to make drive-belts with comparatively long tapering metallic lugs, designed to work in V-shaped grooves in the peripheries of wheels, and that such contrivances have been made the subject of foreign Letters Patent; but my invention should be easily distinguished from any such proposed contrivances, because in them the tapering bearing-surfaces of the lugs or projections were of such extent in the direction of the length of the chain as to render them incapable of the peculiar and described mode of operation of the bearing-surfaces of my improved metallic drive-belt, in which the bearing-surfaces are so short relatively to the wheel on which the chain is designed for use that they come into contact with the opposing surfaces of the wheel throughout their entire length.

What I claim, broadly, as my invention, and desire to secure by Letters Patent, is—

A drive-belt adapted to engage with a wheel having metallic or other rigid tapering peripheral bearing-surfaces, said belt having tapering lugs which form bearing-surfaces corresponding, substantially, in taper to the taper of the peripheral bearing-surfaces of the wheel for which the belt may be designed, and each made of such a width (or extent in the direction of the length of the belt) relatively to the wheel as to practically come in contact throughout the whole extent of its bearing-surfaces with the peripheral bearing-surfaces of said wheel, as set forth.

In witness whereof I have hereunto set my hand this 8th day of February, 1881.

JAMES M. DODGE.

In presence of—
  W. D. EWART,
  JACOB FELBEL.